United States Patent [19]

Weeber

[11] Patent Number: 5,200,982
[45] Date of Patent: Apr. 6, 1993

[54] IN-LINE PIECE-WISE LINEAR DESYNCHRONIZER

[75] Inventor: William B. Weeber, Apex, N.C.

[73] Assignee: Alcatel Network Systems, Inc., Richardson, Tex.

[21] Appl. No.: 771,037

[22] Filed: Oct. 2, 1991

[51] Int. Cl.[5] .............................................. H04L 7/00
[52] U.S. Cl. .................................... 375/118; 370/102; 370/105.3
[58] Field of Search ....................... 375/118, 119, 120; 370/102, 105.3, 108

[56] References Cited

U.S. PATENT DOCUMENTS

| | | | |
|---|---|---|---|
| 4,965,794 | 10/1990 | Smith | 375/118 |
| 4,996,698 | 2/1991 | Nelson . | |
| 5,014,271 | 5/1991 | Fujimoto et al. | 370/102 |
| 5,052,025 | 9/1991 | Duff et al. . | |
| 5,131,013 | 7/1992 | Choi | 375/118 |

OTHER PUBLICATIONS

Design & Performance Verification of a Sonet-to-DS 3 Desynchronizer by Robert W. Hamlin, Jr. Transwitch Corp. 8 Progress Drive, Shelton, Conn. 06484 Date unknown but prior to Jan. 27, 1992.

Primary Examiner—Stephen Chin
Attorney, Agent, or Firm—Ware, Fressola, Van Der Sluys & Adolphson

[57] ABSTRACT

An in-line piece-wise linear desynchronizer eliminates the need for very low bandwidth analog, phase lock loops to smooth phase jumps caused by pointer changes such as those associated with a DS-1 signal mapped into a SONET VT 1.5 payload. The desynchronizer comprises a digital elastic store position detection circuit, a digital frame induced jitter filter, a digital leak rate filter, and a digital frequency synthesizer (VCO). The magnitude of the jitter can be reduced to any level by adjusting the digital VCO resolution and digital leak rate filter time constant. The desynchronizer produces a digitally synthesized output clock which can then be coupled to an analog/digital phase lock loop for smoothing high frequency jitter in the synthesized output clock, thereby providing an in-line interface function.

7 Claims, 11 Drawing Sheets

IN-LINE PIECE-WISE DESYNCHRONIZER BLOCK DIAGRAM

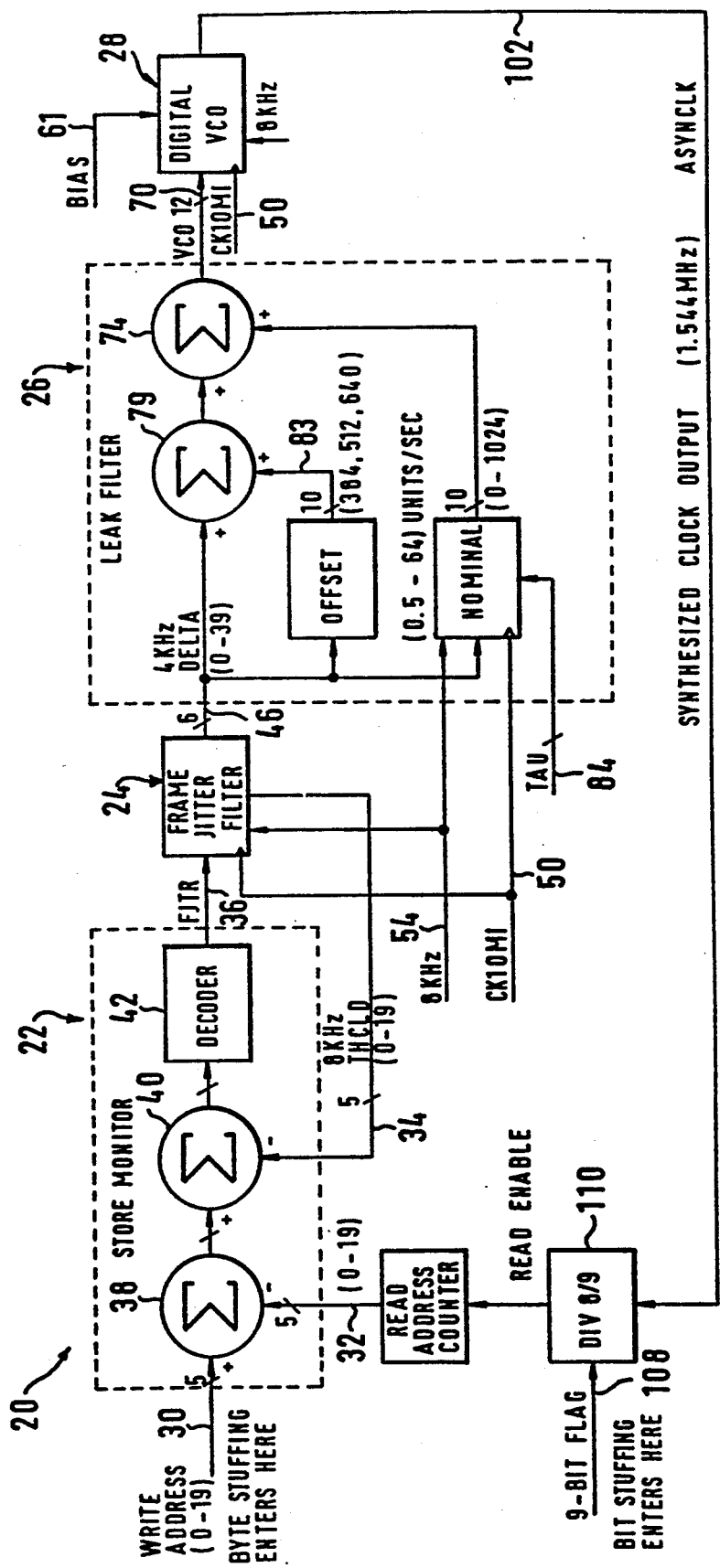

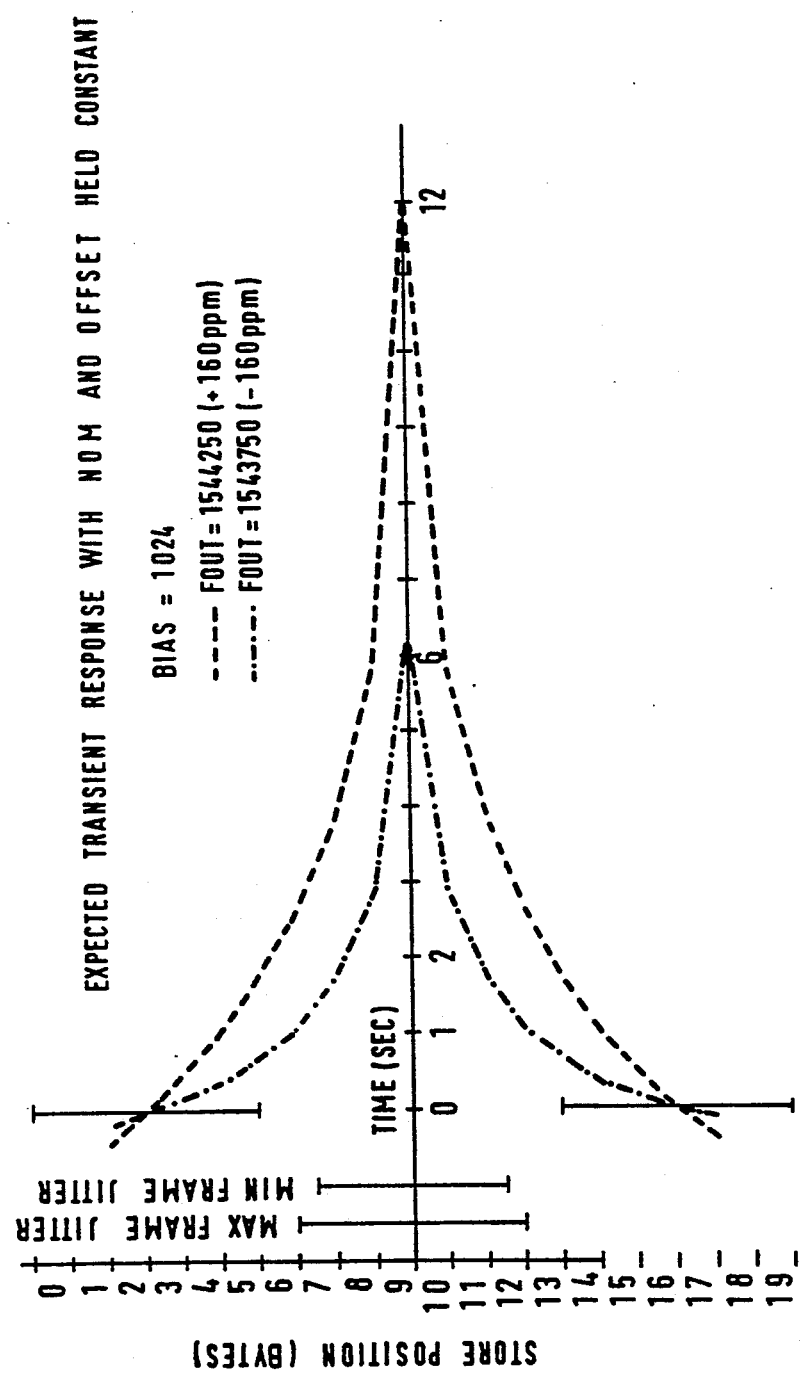
FIG. 2 TRANSIENT RESPONSE

FIG. 3    TX DIGITAL ELASTIC STORE MONITOR
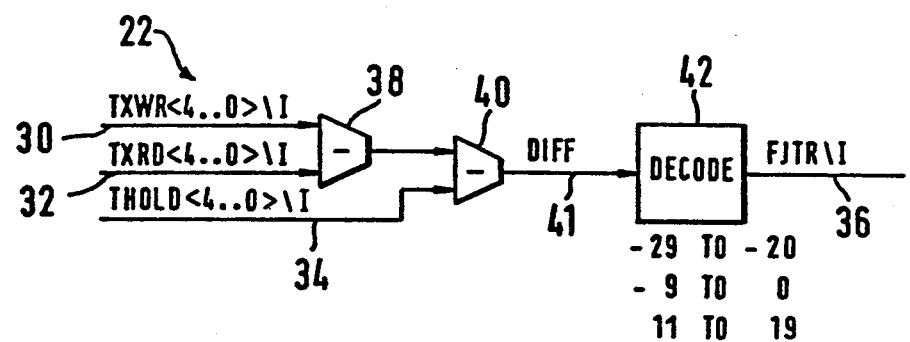

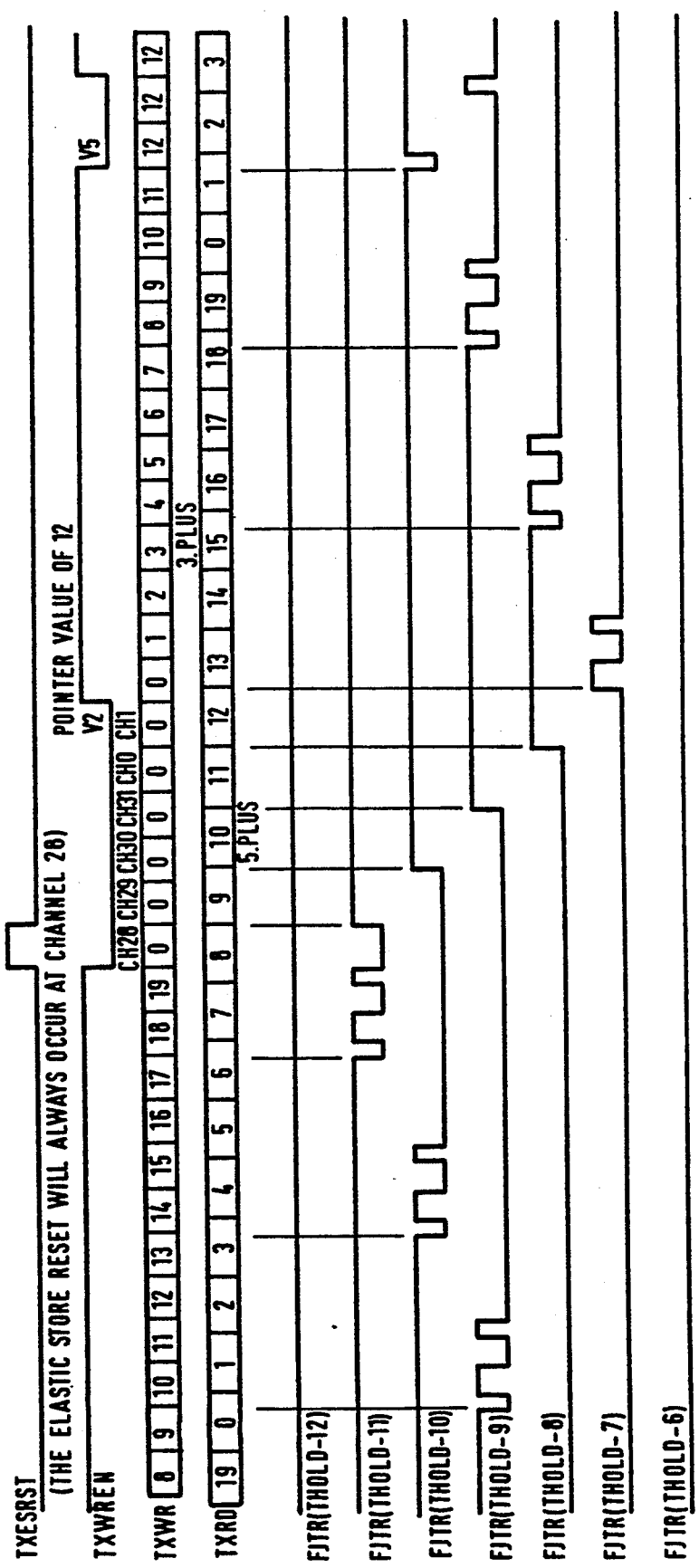
FIG. 4 TX STORE MONITOR TIMING EXAMPLE

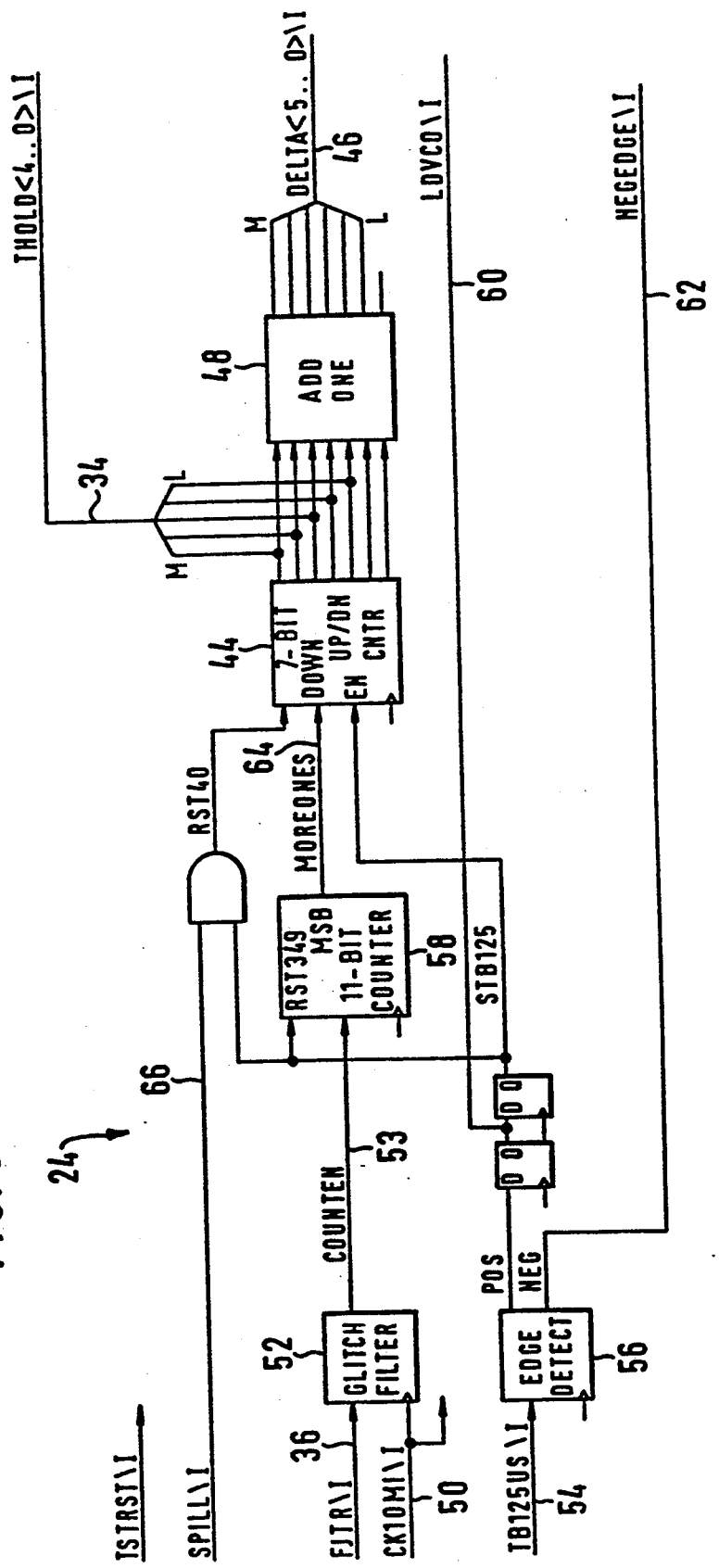
FIG. 5  DIGITAL FRAME JITTER FILTER

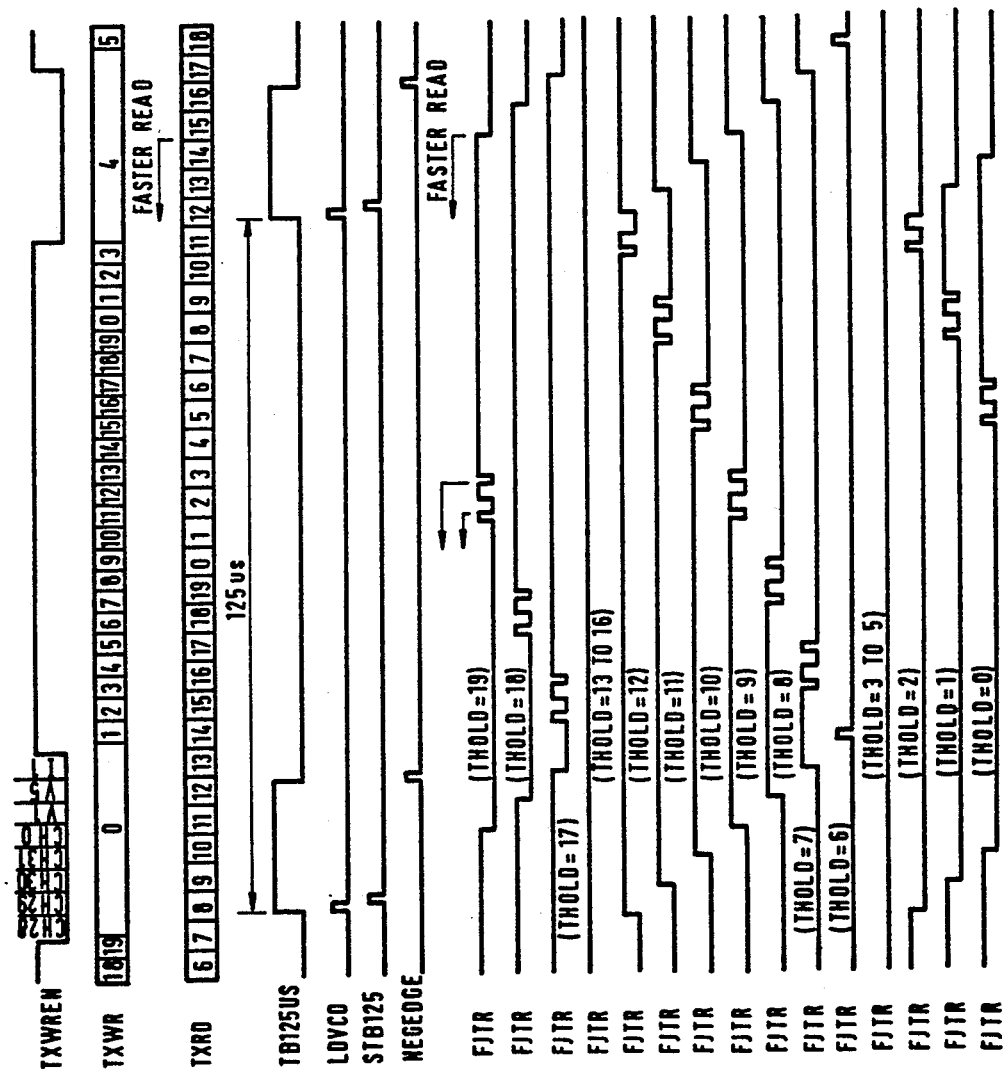

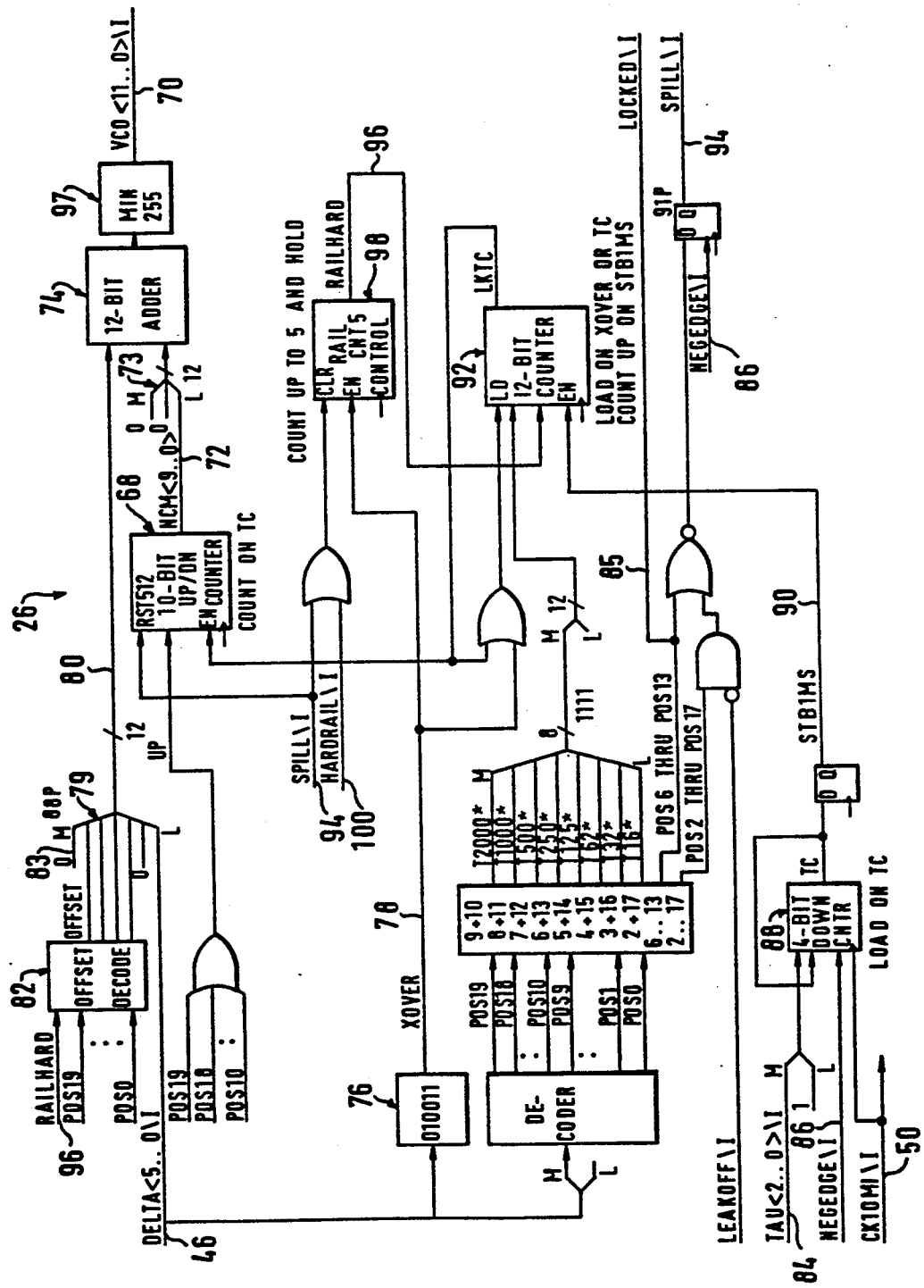

FIG. 8 LEAK FILTER DECODING

| 7-BIT UP/DOWN COUNTER | THOLD | DELTA | OFFSET | STEPS / SEC NOM |
|---|---|---|---|---|
| 00-07 | 00-00 0 | 00-01 POS 0 SPILL | | |
| 08-0F | 00-01 1 | 02-03 POS 1 SPILL | | |
| 10-17 | 02-02 2 | 04-05 POS 2 | (0) 384 | (-64) -64 |
| 18-1F | 03-03 3 | 06-07 POS 3 | (0) 384 | (-64) -32 |
| 20-27 | 04-04 4 | 08-09 POS 4 | (0) 512 | (-64) -16 |
| 28-2F | 05-05 5 | 0A-0B POS 5 | 512 | (-32) -8 |
| 30-37 | 06-06 6 | 0C-0D POS 6 | 512 | -4 |
| 38-3F | 07-07 7 | 0E-0F POS 7 | 512 | -2 |
| 40-47 | 08-08 8 | 10-11 POS 8 | 512 | -1 |
| 48-4F | 09-09 9 | 12-13 POS 9 XOVER | 512 | -0.5 (RAILHARD ACTIVE) |
| 50-57 | 0A-0A 10 | 14-15 POS 10 | 512 | +0.5 |
| 58-5F | 0B-0B 11 | 16-17 POS 11 | 512 | +1 |
| 60-67 | 0C-0C 12 | 18-19 POS 12 | 512 | +2 |
| 68-6F | 0D-0D 13 | 1A-1B POS 13 | 512 | +4 |
| 70-77 | 0E-0E 14 | 1C-1D POS 14 | 512 | (+32) +8 |
| 78-7F | 0F-0F 15 | 1E-1F POS 15 | (1536) 512 | (+64) +16 |
| 80-87 | 10-10 16 | 20-21 POS 16 | (1536) 640 | (+64) +32 |
| 88-8F | 11-11 17 | 22-23 POS 17 | (1536) 640 | (+64) +64 |
| 90-97 | 12-12 18 | 24-25 POS 18 SPILL | | |
| 98-9F | 13-13 19 | 26-27 POS 19 SPILL | | |

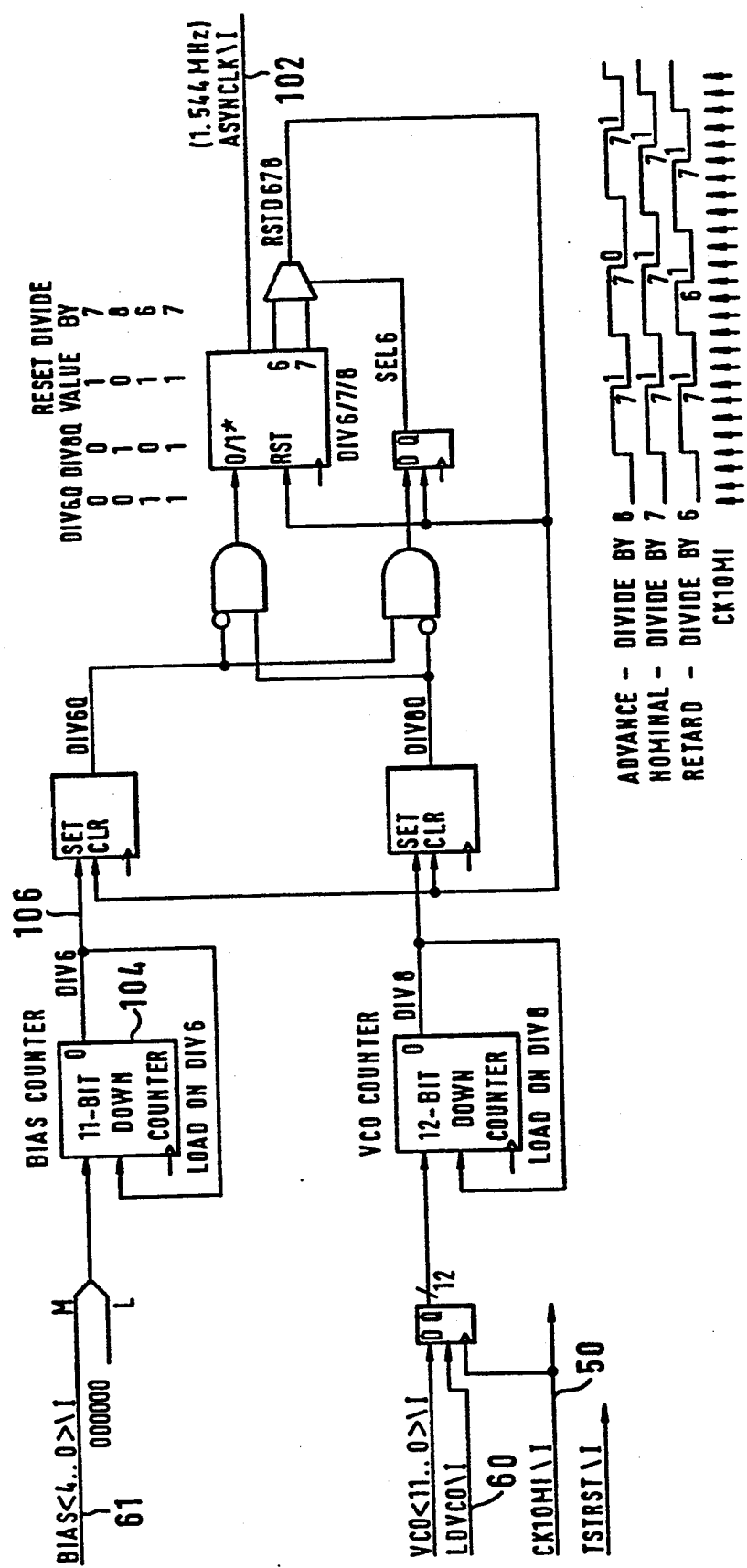
FIG. 9 DIGITAL VCO

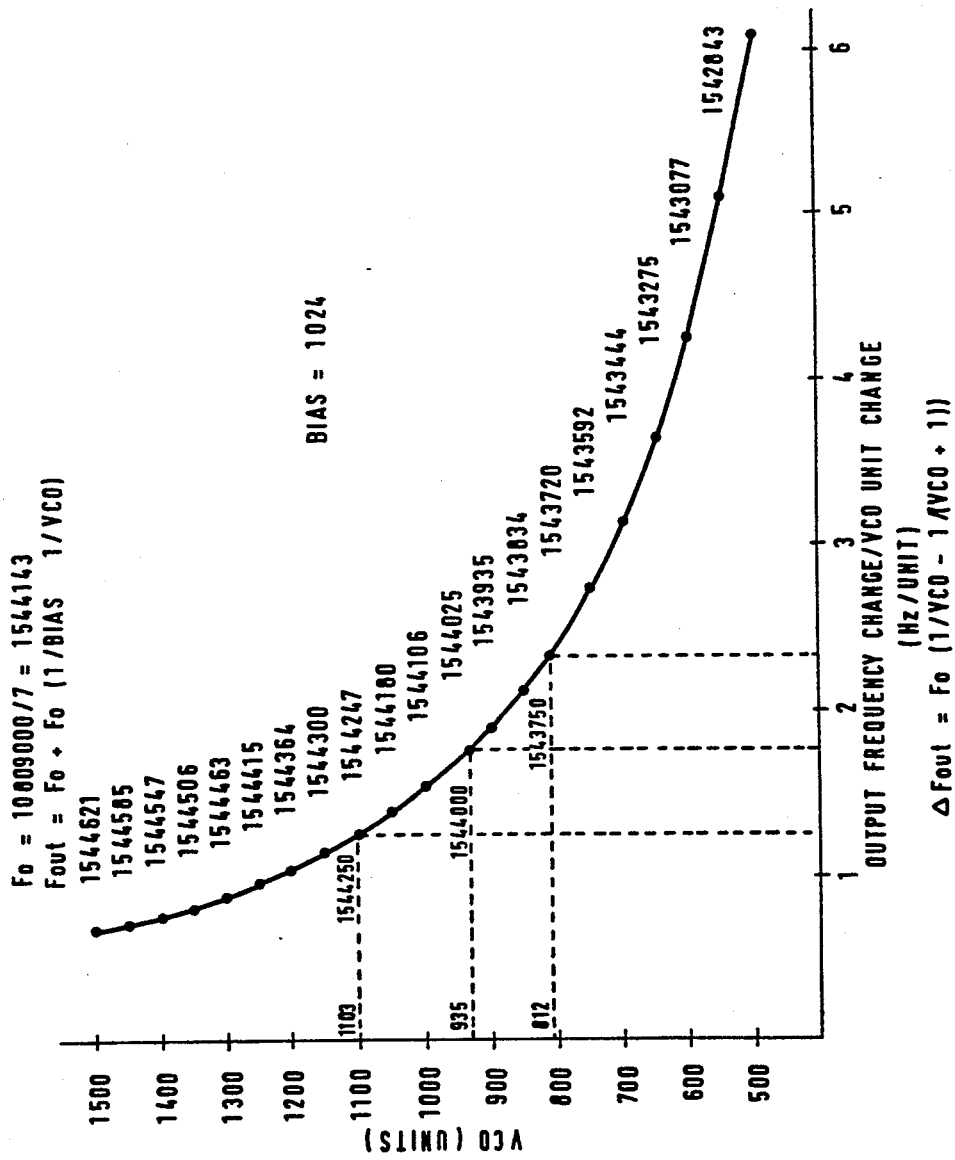
FIG. 10 VCO CHARACTERISTICS

IN-LINE PIECE-WISE LINEAR DESYNCHRONIZER

TECHNICAL FIELD

The present invention relates to desynchronizer circuits for use in mapping telephony signals operating in a first format and data rate into those operating in a second format and/or data rate. It is particularly directed to desynchronizers associated with mapping telephony signals into a synchronous optical network (SONET) virtual tributary (VT) format.

BACKGROUND ART

Over the last several years, the use of fiber optics for transmissions of telephony signals has gained wider acceptance in the telecommunication field. In particular, the synchronous optical network standard known as SONET has developed appreciable usage. The SONET format requires that telephony signals operating in different formats, such as DS-1 signals, DS-2 signals, DS-3 signals, and fiber distributed data interface (FDDI), need to be desynchronized from their SONET format or other formats associated with telephony transmission. In particular, such desynchronizers must meet specifications with regard to phase jumps caused by pointer changes such as a DS-1 signal being mapped into a SONET virtual tributary (VT) such as a VT 1.5 payload.

To accomplish such a result, there is a need for very low bandwidth phase lock loops in order to smooth the phase jumps associated with such pointer changes. An approach for implementing such smooth phase jumps could be based upon analog loop circuitry, which for the particular implementation noted above, could be used to reduce the eight Unit Interval (UI) pointer adjustment in order to extract a DS-1 payload from a SONET VT 1.5 payload. In order to accomplish this result with analog circuitry, bandwidths in the 2 Hz region are required to reduce the jitter content of the output phase transition to levels approximately equal to 1.5 UI, with lower jitter levels being more desirable, but of course requiring lower bandwidths. Bandwidths this low require extremely large time constants (time constant $\tau = rc$) and therefore large component values for the filter resistor and capacitor. In addition, such analog phase lock loops are slow to lock, thus causing large time delays after transients have occurred before the DS-1 channel can be used for data transmission again.

Another approach for coping with such pointer changes is to use a fixed bit leak-out desynchronizer. For DS-1 format desynchronizers using this technique, it is possible to use relatively large bandwidths analog phase lock loops operating in the 50 to 400 Hz range which are adequate to filter waiting time and mapping jitter. However, such a desynchronizer still requires a digital adjunct circuit to hide low occurrence transient effects such as pointer adjustments from the high bandwidth analog phase lock loop. If these transients are not hidden from the high bandwidth phase lock loop, jitter approaching 8 UI pp can occur from a single VT pointer adjustment.

While such a fixed bit leak desynchronizer hides the bulk of the pointer movement from the high bandwidth phase lock loop, it performs equalization by leaking out the original pointer adjustment one bit at a time, into a high bandwidth phase lock loop. Such an equalization is necessary in order to prevent the desynchronizer's elastic store from overflowing. Thus, as each bit is leaked out, usually as fast as possible without exceeding the overall payload output jitter specification, jitter from 0.7 to 1.5 UI pp is generated by the phase transitions in the output signal.

The present invention overcomes the above-mentioned difficulties by effectively hiding pointer adjustments as noted above through use of a technique configured as an inline piece-wise linear adaptive leaking architecture. This architecture employs a digital elastic store position detection circuit, a digital frame induced jitter filtering circuit, a digital leak rate filter circuit, and a digital frequency synthesizer (VCO). The magnitude of the jitter can be reduced to any arbitrarily low level by adjusting the digital VCO gain characteristics and the digital rate filter integration time constant, and hence, the bandwidth.

The present invention has the same net effect as the analog only phase lock loop described above, except that very low analog phase lock loop bandwidths are not required. The embodiment of the present invention uses very low bandwidth characteristics to produce a digitally synthesized output clock which is coupled to a commercially available analog/digital phase lock loop circuit. The commercially available phase lock loop has an effective bandwidth of 6 Hz and is required only for smoothing the high frequency jitter in the synthesized output clock and providing a line interface function.

SUMMARY OF THE INVENTION

An in-line piece-wise linear desynchronizer circuit alleviates the need for very low bandwidth analog phase lock loops in order to smooth phase jumps associated with pointer changes such as on a DS-1 signal mapped into a SONET VT 1.5 payload. The desynchronizer incorporates a digital elastic store monitor for receipt of a write address at a summer which receives on its negative input, an associated read address. The store monitor, through a second summer, employs a negative feedback from a threshold signal with the summed result presented to a decoder so as to generate a frame jitter output signal to an associated frame jitter filter. The output of the filter provides an input to a digital leak filter which through its associated circuitry, presents a VCO output signal as the input to a digital VCO which in turn generates a synthesized clock output. The synthesized clock output, after potential division by an 8/9 divider associated with a 9 bit flag which in turn is associated with bit stuffing of the associated SONET frame, generates an input to a read address counter which in turn provides the read address to the negative input of the store monitor.

The overall result of this desynchronizer is a circuit which can dejitterize the synchronous positive and negative byte adjustments caused by virtual tributary (VT) pointer processor in the network and bit adjustment caused at the gateway network element (NE). A VT pointer adjustment represents an 8 unit interval (8 UI) phase offset transient which would exceed the 1.5 UI jitter output requirement in a conventional phase lock loop of 6 Hz loop bandwidth when used alone as a desynchronizer.

In addition, a number of network elements could produce pointer adjustments simultaneously, which could result in a burst of pointer adjustments at the location of a desynchronizer. The desynchronizer of the present invention is designed to accommodate up to six consecutive pointer adjustments with less than 1 UI of output jitter when measured with a 10 Hz high pass filter.

The in-line piece-wise linear desynchronizer is able to limit the instantaneous output frequency change to under 62 Hz as a result of six consecutive pointer adjustments. The phase detector associated with this desynchronizer employs byte granularity, wherein the instantaneous output frequency change is a direct result of the average byte position in the elastic store. The frequency delta is a function of byte position and long term frequency offset. The long term frequency offset factor is a result of the non-linear characteristics of the digital VCO. The present invention is thereby able to obtain low bandwidth without the use of analog phase lock loops and is further able to greatly reduce settling time associated with transients such as due to payload realignment.

In addition, the desynchronizer is able to reduce payload jitter to very low levels, limited only by the digital VCO gain characteristic and digital leak rate filter integration time constant. Complex parts of the desynchronizer, that provide for very low bandwidth characteristics, are implementable using application specific integrated circuit (ASIC) technology. The use of ASIC fabrication reduces the marginal cost for the desynchronizer since it can be fabricated on the same ASIC that performs many other telephony functions.

The desynchronizer is also designed to use counters to perform most summing functions. The use of such counters rather than more complex adders also reduces fabrication costs.

The overall design of this desynchronizer is more robust and better performing than fixed bit-leak out desynchronizers.

Finally, the present invention is able to eliminate the need for separate loops associated with byte stuffing and bit stuffing.

OBJECTS OF THE INVENTION

It is therefore a principal object of the present invention to provide a desynchronizer circuit to smooth phase jumps associated with reformatting telephony signals of one format into another.

Another object of the present invention is to provide a desynchronizer of the above characteristics, wherein it is particularly suited for converting SONET VT 1.5 type payload signals into DS-1 type.

A still further object of the present invention is to provide a desynchronizer of the above characteristic using digital techniques for providing a low bandwidth and thereby avoiding the need to use analog phase lock loops for achieving such a low bandwidth.

A still further object of the present invention is to provide a desynchronizer of the above characteristics having a fault recovery mechanism, wherein the settling time associated with transients is greatly reduced as compared to analog phase lock loop techniques.

A still further object of the present invention is to provide a desynchronizer of the above characteristic in which the payload jitter can be reduced to very low levels, limited only by the digital VCO gain characteristics and digital leak rate filter integration time constant.

Another object of the present invention is to provide a desynchronizer of the above characteristic in which the desynchronizer components associated with the digital low bandwidth portions can be implemented with other telephony circuitry in application specific integrated circuitry so that the marginal fabrication costs of the desynchronizer is low compared to other fabrication techniques.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings in which:

FIG. 1 is an overall block diagram of an in-line piece-wise linear desynchronizer according to the present invention.

FIG. 2 is a diagram showing the transient response of the present invention and in particular, the step response generated for two different operating frequencies.

FIG. 3 is a schematic diagram of a portion of the transmitter digital elastic store monitor module shown in FIG. 16.

FIG. 4 is a series of waveforms associated with the transmitter store monitor illustrating a typical timing example.

FIG. 5 is a block diagram of the digital frame jitter filter module shown in FIG. 1.

FIG. 6 is a timing diagram illustrating the operation of the frame jitter filter.

FIG. 7 is a block diagram of the digital leak filter module shown in FIG. 1.

FIG. 8 is a diagram illustrating the leak filter decoding associated with the leak filter module.

FIG. 9 is block diagram of the digital VCO module shown in FIG. i.

FIG. 10 is a diagram showing the operating characteristics of the digital VCO module.

BEST MODE FOR CARRYING OUT THE INVENTION

Figure 1A:
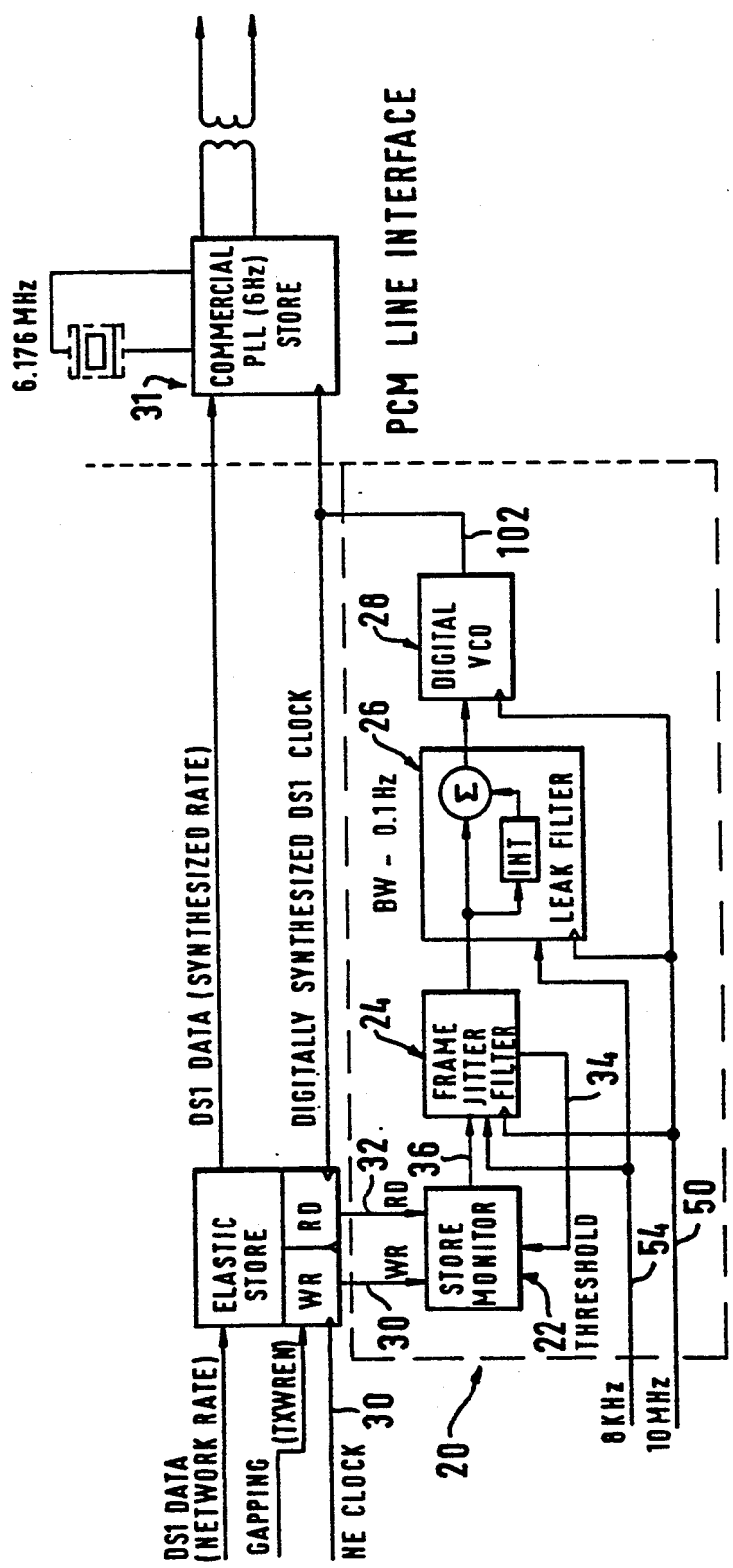
FIG. 1A is a block diagram showing a typical overall environment in which the desynchronizer shown in FIG. 1 can be used.

As seen in FIG. 1, an in-line piece-wise desynchronizer 20 according to the present invention functions as an in-line piece-wise linear adaptive digital phase lock loop (PLL). The typical environment of the desynchronizer is shown in FIG. IA. In particular, this desynchronizer is specifically designed to provide the following functions: 1) to dejitterize the serial bus interface (SBI) which gaps from the virtual tributary (VT) VT 1.5 synchronous payload envelope (SPE); 2) to dejitterize the VT overhead associated with DS-1 data; 3) to dejitterize the asynchronous positive and negative bit adjustments created at a gateway network element (NE); and 4) to dejitterize the synchronous positive and negative byte adjustments caused by VT pointer processors in the network.

The SBI noted above is described in copending U.S. application, Ser. No. 351,458, filed May 12, 1989, owned by the present assignee. The disclosure in this copending application is hereby incorporated by reference. The American National Standard for Telecommunication ANSI Document T1.1051988 entitled *Digital Hierarchy Optical Interface Rates and Formats Specification* is also hereby incorporated by reference.

With current technology, the first three of the above noted four functions can be accomplished using conventional analog phase lock loop techniques. However, the dejitterization of the synchronous positive and negative byte adjustments caused by VT pointer processors in the network cannot be accomplished without very long time constant analog loops with resulting large capacitance and resistive elements. Such elements are not desirable in digital transmission circuitry and the present invention provides a solution to this problem.

In particular, a VT pointer adjustment represents an eight unit interval (8 UI) phase offset transient which exceeds the 1.5 UI jitter output requirement if a conventional phase lock loop of 6 Hz loop bandwidth is used alone as a desynchronizer. Furthermore, if a number of network elements in the network could each produce pointer adjustments at the same time, this event would result in a burst of pointer adjustments at the desynchronizer. The present invention is a desynchronizer which can accommodate up to six consecutive pointer adjustments while yielding less than one UI of output jitter when measured with a 10 Hz highpass filter.

An analysis of the present invention can best be understood by first analyzing the results obtained by a fixed rate offset bit leaking circuit which is designed to limit the output jitter to no more than one UI. To obtain this outer jitter limit for six consecutive pointer adjustments, a 48 UI (6×8 UI per pointer adjustment) must be accommodated. A suitable offset rate is then derived to leak the 48 UI phase adjustment over a long enough period of time so as not to cause more than one UI per pointer (pp) of jitter.

An instantaneous offset in a DS-1 output frequency of 62 Hz causes approximately one UI of output jitter when measured with a 10 Hz highpass filter. Consequently, 48 UI could be passed by changing the DS-1 output frequency by 62 Hz for 768 (msec), wherein one unit interval occurs per 16 (msec).

The present invention avoids separate loops for handling byte stuffing and bit stuffing by use of an in-line piece-wise linear adaptive desynchronizer. The objective is to limit the instantaneous output frequency change to under 62 Hz as a result of six consecutive pointer adjustments. In order to achieve this result, the phase detector is designed to have byte granularity, where the instantaneous output frequency change is a direct result of average byte position in the associated elastic store. The frequency delta is a function of byte position and long-term frequency offset. The long-term frequency offset factor is a result of the non-linear gain characteristics of the associated digital voltage control oscillator (digital VCO) 28 (see FIG. 1).

Table 1 illustrates the output frequency change as a result of average elastic store position. FIG. 2 illustrates the step response generated by the piece-wise frequency steps.

TABLE 1

| | DS-1 OUTPUT FREQUENCY (BIAS = 1024) | | |
|---|---|---|---|
| HYTE POSITION | 1543750 Hz DELTA (Hz) | 1544000 Hz DELTA (Hz) | 1544250 Hz DELTA (Hz) |
| 0 | | | |
| 1 | | | |
| 2 | −34.5 | −27.0 | −19.5 |
| 3 | −29.9 | −23.4 | −16.9 |
| 4 | −25.5 | −19.8 | −14.3 |
| 5 | −20.7 | −16.2 | −11.7 |
| 6 | −16.1 | −12.6 | −9.1 |
| 7 | −11.5 | −9.0 | −7.6 |
| 8 | −6.9 | −5.4 | −3.9 |
| 9 | −2.3 | −1.8 | −1.3 |
| 10 | +2.3 | +1.8 | +1.3 |
| 11 | +6.9 | +5.4 | +3.9 |

TABLE 1-continued

| | DS-1 OUTPUT FREQUENCY (BIAS = 1024) | | |
|---|---|---|---|
| HYTE POSITION | 1543750 Hz DELTA (Hz) | 1544000 Hz DELTA (Hz) | 1544250 Hz DELTA (Hz) |
| 12 | +11.5 | +9.0 | +6.5 |
| 13 | +16.1 | +12.6 | +9.1 |
| 14 | +20.7 | +16.2 | +11.7 |
| 15 | +25.5 | +19.8 | +14.3 |
| 16 | +29.9 | +23.4 | +16.9 |
| 17 | +34.5 | +27.0 | +19.5 |
| 18 | | | |
| 19 | | | |

As seen in FIG. 1A, with the above design, an external conventional 6 Hz phase lock loop 31 is required to smooth the high frequency jitter developed by the instantaneous 0.28% of a bit edge movement caused by the digital phase lock loop. As seen in Table 1, even for the worst case DS-1 operating frequency of 1.54375 Hz, a 6 byte pointer adjustment results in less than 62 Hz of DS-1 output frequency adjustment, and consequently, less than one UI of jitter for the in-line piece-wise bit leaking desynchronizer shown in FIG. 1 with a transient response shown in FIG. 2. Details of the module shown in FIG. 1 are presented below.

Detailed Module Description

Transmit Digital Elastic Store Monitor Block 22.

As seen in FIGS. 1 and 3, the transmit digital elastic store monitor block 22 has three input signals, the write address 30, the read address counter output 32, and the threshold signal 34, each signal having five bits of resolution. The transmit store monitor 22 generates a single output 36 called the frame jitter output (FJTR). Summer 38 combines the write address with the negative value of the read address with the result proceeding as the positive input to summer 40 which in turn receives the negative input of the threshold value. The output of summer 40 is connected to decoder 42 which in turn generates the FJTR output 36. The frame jitter output indicates the difference between the read and write addresses and whether these differences are greater or less than the selected threshold.

Functionally this block operates according to the following equation.

$$DIFF<6..0> = TXWR<4..0> - TXRD<4..0> - THOLD<4..0>$$

The decoder operation is set forth in Table 2 below.

TABLE 2

| DIFF | FJTR | DIFF | FJTR | DIFF | FJTR |
|---|---|---|---|---|---|
| | | −19 | 0 | 1 | 0 |
| −38 | 0 | −18 | 0 | 2 | 0 |
| −37 | 0 | −17 | 0 | 3 | 0 |
| −36 | 0 | −16 | 0 | 4 | 0 |
| −35 | 0 | −15 | 0 | 5 | 0 |
| −34 | 0 | −14 | 0 | 6 | 0 |
| −33 | 0 | −13 | 0 | 7 | 0 |
| −32 | 0 | −12 | 0 | 8 | 0 |
| −31 | 0 | −11 | 0 | 9 | 0 |
| −30 | 0 | −10 | 0 | 10 | 0 |
| −29 | 1 | −9 | 1 | 11 | 1 |
| −28 | 1 | −8 | 1 | 12 | 1 |
| −27 | 1 | −7 | 1 | 13 | 1 |
| −26 | 1 | −6 | 1 | 14 | 1 |
| −25 | 1 | −5 | 1 | 15 | 1 |
| −24 | 1 | −4 | 1 | 16 | 1 |
| −23 | 1 | −3 | 1 | 17 | 1 |
| −22 | 1 | −2 | 1 | 18 | 1 |

TABLE 2-continued

| DIFF | FJTR | DIFF | FJTR | DIFF | FJTR |
|---|---|---|---|---|---|
| −21 | 1 | −1 | 1 | 19 | 1 |
| −20 | 1 | 0 | 1 | | |

FIG. 4 is a timing diagram showing the waveform output for FJTR for different threshold values. As can be seen in FIG. 4, two adjacent thresholds, when filtered by the jitter filter 24, transition from mostly high to mostly low over a one frame interval (125 microseconds). The transition locates the center of the frame induced jitter so as to be between the two thresholds. The threshold is selected by the frame jitter filter module 24.

Digital Frame Jitter Filter Module 24

The frame jitter filter module 24 tracks the transition of mostly 1's or mostly 0's by selecting of the twenty thresholds in the transmit store monitor 22 and filtering it for one frame. The inputs and outputs associated with this module are detailed in Table 3.

TABLE 3

| Input/Output Description | |
|---|---|
| Block Inputs: | Block Outputs: |
| FJTR 36 | THOLD < 4...0 > 34 |
| CK10MI 50 | DELTA < 5...0 > 46 |
| TB125US 54 | LDVCO 60 |
| SPILL 66 | NEGEDGE 62 |
| TSTRST | |

As seen in FIG. 5, this jitter filter comprises an up-/down counter 44 which generates the THOLD signal 34. The filtered frame jitter signal 36 is an input to the frame jitter filter 24 and determines which threshold is selected next by causing the counter to count up or down. The counter value is used to generate output signal DELTA 46 after passing through an add one module 48. The frame jitter filter is clocked by signal 50 (CK10MI) operating at 10.809 MHz. FIG. 6 presents the timing associated with this filter module.

The frame jitter input 36 is asynchronous to the clock input 50 (CK10MI) and also contains potential glitches when the read or write addresses are in a transition. A glitch filter 52 is used to eliminate metastability problems and also filters the unwanted glitches. The output of the glitch filter (COUNTEN53) contains a transition only if a transition of FJTR is detected for two consecutive times.

The 125 microsecond time base input 54 (TB125US) is also asynchronous to the CK10MI input 50. An edge detection circuit 50 is used to eliminate metastability problems. The positive edge of the TB125US signal causes the 11-bit counter 58 to reset and the up/down counter 44 to be enabled. The positive edge of the TB125US signal also sets a signal identified as LDVCO. The LDVCO signal 60 is output to the digital VCO module 28 as identified by an 8 KHz clock.

On the negative edge of the TB125US signal, a pulse 62 (NEGEDGE) is output to the digital leak filter module 26 where it is used as a timebase for leak filter processing.

The 11-bit counter 58 is reset to the value 349 every 125 microseconds. If COUNTEN 53 is active less than 676 clock cycles for the 10.809 MHz clock (CK10MI), then the most significant bit of the clock (MOREONES output 64) is set to a low state. If COUNTEN is active for more than 675 clock cycles, the MOREONES output is set high.

The 7-bit up/down counter 44 operates on a modulus of 80. The five most significant bits (THOLD<4..0>) are output to the TX store monitor 22 as seen in FIG. 1 (THOLD 34). The phase delta output (DELTA<5..0>) is derived by adding "1" to the value of the 7-bit counter and truncating the least significant bit. The DELTA output 46 of the add 1 module is input to the digital, leak filter module 26. If the value of DELTA is out of its allowable range, the leak filter module 26 responds with a SPILL signal 66 so as to reset the 7-bit up/down counter 44 to the value of 40.

Digital Leak Filter Module 26

The digital leak filter module 26 is best seen in FIGS. 1 and 7. The inputs and outputs associated with this module are detailed in Table 4.

TABLE 4

| Input/Output Description | |
|---|---|
| Block Inputs | Block Outputs |
| DELTA < 5...0 > 46 | VCO < 11...0 > 70 |
| CK10MI 50 | SPILL 94 |
| NEGEDGE 86 | |
| HARDRAIL 100 | |
| LEAKOFF | |
| TAU < 2...0 > 84 | |
| TSTRST | |

The digital leak filter module filters the input DELTA 46 and generates an VCO output signal 70 which is the input to the digital VCO module 28. An internal 10-bit count value (NOM) 72 is generated by counter 68. A 12-bit adder 74 receives this input (after two zero bits are added as MSB bits 10 and 11—see merge body 73) and adds it to the DELTA offset value 82 so as to produce the 12-bit VCO output 70. The NOM output 72 tracks the full ±130 ppm frequency range that an asynchronous DS-1 may exhibit.

The DELTA value 46 is monitored for store center crossover. A 2-second counter 76 generates a reset value on crossover output signal XOVER 78 every time a crossover is detected. If a crossover is not detected after two seconds, the NOM value 72 is incremented or decremented, depending upon which side of center the DELTA value occurred. This technique has an effect on the digital VCO 28 so as to bring the jitter pattern toward the center of the store. The value of NOM 72 is in effect an integration of DELTA - DELTA/2.

Additional functions of the leak filter module include variable time constants depending upon the DELTA value (that is, the NOM value changes faster when the DELTA value is far from center). Additional OFFSET coefficients are generated on output 80 by merge body 79 as a result of OFFSET decoder 82 so as to be added to the VCO signal 70 when the store is about to spill. The purpose of the OFFSET signal is to prevent spills at the expense of output jitter. The OFFSET signal remains constant unless a spill is about to occur. The implementation of this feature is best seen in FIG. 7 and the decoding functionality is shown in FIG. 8.

The TAU input 84 provides a programmable timebase for the NOM filter time constants. The TAU signal is mapped into the test input bus TSTDI<9..7>. The NEGEDGE 86 operates at a 125 microsecond rate and is input to a 4-bit programmable counter 88. The output signal STB1MS 90 of counter 88 provides basic timing to the digital leak filter and has the characteristics set forth in Table 5.

TABLE 5

| TAU <2...0> | STB1MS |
|---|---|
| 000 | 250 us |
| 001 | 500 us |
| 010 | 750 us |
| 011 | 1000 us |
| 100 | 1250 us |
| 101 | 1500 us |
| 110 | 1750 us |
| 111 | 2000 us |

The information in this description is related to a value of TAU 011, which therefore provides a 1,000 microsecond timebase for STB1MS.

The functional behavior of the leak filter 26 is set forth below:

$$VCO = NOM + DELTA + OFFSET$$

This equation is clearly seen by the overall block diagram for the leak module shown in FIG. 1.

It is also seen that NOM is a function of DELTA, TAU, and RAILHARD. Furthermore, NOM is held constant when a DELTA crossover (DELTA=19) is detected within 2.048 seconds, since the 12-bit counter 92 (see FIG. 7) which is a loadable decrement counter, never times out. If a crossover is not detected within 2.048 seconds, then NOM changes at a rate determined by DELTA. The 12-bit counter has a modulo which is dependent on DELTA. As seen in FIG. 7, the output value of NOM is the result of 10-bit up/down counter 68 and can have a value from 0 to 1023. The NOM value is reset to 512 after a spill has occurred as a result of a generation of an enabled spill signal 94. When RAILHARD 96 is activated, the 12-bit counter 92 takes on a different set of modulo near the spill region.

The OFFSET signal 83 is held constant at a value of 512 when DELTA is between 8 and 31. If the DELTA value is approaching a spill, then OFFSET is changed, thereby having the effect of widening the bandwidth.

The overall operation of the leak filter is set forth in Table 6.

TABLE 6

| DELTA | SPILL REGION | 12-BIT CNTR MODULO | RATE OF CHANGE NOM (steps/sec) | OFFSET |
|---|---|---|---|---|
| 0,1 | YES | — | — | — |
| 2,3 | YES | — | — | — |
| 4,5 | NO* | 16 | −64 | 384 (0) |
| 6,7 | NO* | 32 (16) | −32 (−64) | 384 (0) |
| 8,9 | NO* | 64 (116) | −16 (−64) | 512 (0) |
| 10,11 | NO* | 128 (32) | −8 (−32) | 512 |
| 12,13 | NO | 256 | −4 | 512 |
| 14,15 | NO | 512 | −2 | 512 |
| 16,17 | NO | 1024 | −1 | 512 |
| 18,19 | NO | 2048 | −0.5 | 512 |
| 20,21 | NO | 2048 | 0.5 | 512 |
| 21,22 | NO | 1024 | 1 | 512 |
| 23,24 | NO | 512 | 2 | 512 |
| 25,26 | NO | 256 | 4 | 512 |
| 28,29 | NO* | 128 (32) | 8 (32) | 512 (1536) |
| 30,31 | NO* | 64 (16) | 16 (64) | 512 (1536) |
| 32,33 | NO* | 32 (16) | 32 (64) | 640 (1536) |
| 34,35 | NO* | 16 | 64 | 640 (1536) |
| 36,37 | YES | — | — | — |
| 38,39 | YES | — | — | — |
| 40-63 | YES | — | — | — |

NOTES
1: Values in parenthesis () are with RAILHARD active.
2: "NO*" denotes a spill region only when LEAKOFF is active.

A LOCKED indicator signal 85 is output to the VI Reporting block. This signal is active when DELTA is between 12 and 26.

The rail control consists of a rail control counter 98 which counts up to 5 and then holds. After a spill, the counter is reset to 0 and RAILHARD goes active. RAILHARD remains active until five crossovers have been detected. RAILHARD can also be provisioned to be active indefinitely by setting the HARDRAIL provisioning bit 100.

Before VCO<11..0> 70 is output to the Digital VCO module 28, it is monitored to guarantee a minimum value of 255 by module 97.

When the desynchronizer is locked, DELTA ranges from 18 to 20, is a constant from 0 to 1023, and OFFSET is 512. The locking range for the VCO output is therefore:

VCO (min) = NOM (min) + DELTA(locked_min) + OFFSET(locked)
VCO(min) = 0 + 18 + 512 = 530
VCO(max) = NOM(max) + DELTA(locked_max) + OFFSET(locked)
VCO(max) = 1023 + 20 + 512 = 1555

Transmitter Digital VCO Module 28

The transmitter digital VCO block module has inputs and outputs as set forth in Table 7.

TABLE 7

| Input/Output Description | |
|---|---|
| Block Inputs: | Block Outputs: |
| VCO < 11...0 70> | ASYNCLK 102 |
| CK10MI 50 | |
| LDVCO 60 | |
| BIAS < 4...0 > 61 | |
| TSTRST | |

The digital VCO module produces the synthesized transmit DS-1 clock signal (ASYNCLK) 102 as shown in FIGS. 1 and 9. This clock signal is generated by dividing the CK10MI clock signal 50 which operates at 10.809 MHz by 6, 7 or 8. Normally, the CK10MI clock is divided by 7. The bias signal 61 determines the rate at which the bias counter 104 generates its DIV6Q output 106. The VCO input 70 determines the rate at which a divide by 8 occurs. Details concerning the timing are presented in FIG. 9.

Thus for example, if the bias is set for 1024, a divide by 6 occurs every 1024 10.809 MHz clock cycles. If the VCO input is also at a value of 1024, then a divide by 8 every 1,024 clock cycles occurs and cancels the bias exactly. The output frequency would then be 10.809/7 = 1.544142 MHz. An increase of 1 (VCO=1025) in the VCO input increases the output frequency by 1.471173 Hz. Applying this reasoning to other examples, it is seen that the VCO to output transfer function is non-linear for any fixed BIAS 61. Details are presented in Table 8.

TABLE 8

| VCO CHARACTERISTICS ASYNCLK OUTPUT FREQUENCY | | | | | |
|---|---|---|---|---|---|
| 154370 HZ −160 ppm | | 1544000 Hz NOMINAL | | 1544250 Hz +160 ppm | |
| BIAS | VCO | Hz/-STEP | VCO | Hz STEP | VCO | Hz/STEP |
| 704 | 597 | 4.32 | 660 | 3.53 | 740 | 2.81 |
| 768 | 642 | 3.74 | 717 | 3.00 | 811 | 2.34 |
| 832 | 686 | 3.27 | 772 | 2.58 | 882 | 1.98 |
| 896 | 729 | 2.89 | 827 | 2.25 | 955 | 1.69 |
| 960 | 771 | 2.59 | 882 | 1.98 | 1028 | 1.46 |

TABLE 8-continued

| | VCO CHARACTERISTICS ASYNCLK OUTPUT FREQUENCY | | | | | |
|---|---|---|---|---|---|---|
| | 154370 HZ −160 ppm | | 1544000 Hz NOMINAL | | 1544250 Hz +160 ppm | |
| BIAS | VCO | Hz/-STEP | VCO | Hz STEP | VCO | Hz/STEP |
| 1024 | 812 | 2.33 | 935 | 1.76 | 1102 | 1.27 |
| 1188 | 852 | 2.12 | 988 | 1.57 | 1177 | 1.11 |
| 1152 | 890 | 1.94 | 1041 | 1.42 | 1252 | 0.98 |
| 1216 | 928 | 1.79 | 1093 | 1.29 | 1328 | 0.87 |
| 1280 | 965 | 1.65 | 1144 | 1.18 | 1405 | 0.78 |

Alteration of the BIAS value has the effect of changing the step response of the desynchronizer and thus changing the bandwidth. Different bias settings can be programmed from test bus input pins (not shown). Table 9 presents the bias modulus, depending upon bias value.

TABLE 9

| BIAS < 4...0> | BIAS MODULUS |
|---|---|
| 01011 | 704 |
| 01100 | 768 |
| 01101 | 832 |
| 01110 | 896 |
| 01111 | 960 |
| 10000 | 1024 |
| 10001 | 1088 |
| 10010 | 1152 |
| 10011 | 1216 |
| 10100 | 1280 |

FIG. 10 illustrates the VCO gain characteristics and in particular, the change in output frequency versus VCO unit change.

Referring again to FIG. 1, the 9-bit flag input 108 is used for timing information regarding bit stuffing. Basically, when 10 bits are received, the 9-bit flag is enabled which causes the divide by 8/9 module 110 to perform a divide by 9 rather than a divide by 8 of signal 102 from the digital VCO.

Thus what has been described is an in-line piece-wise linear desynchronizer circuit, particularly suitable for smoothing phase jumps caused by pointer adjustments associated with telephony transmission. Although the specific implementation of the desynchronizer discloses smoothing phase jumps associated with a DS-1 signal mapped into a SONET VT 1.5 payload, it is apparent that this technique is equally applicable to other desynchronizers for other data rates and mapping formats, including but not limited to DS-1C rate from SONET VT format;
DS-1C rate from other multiplexing methods;
DS-2 rate from SONET VT format;
DS-2 rate from other multiplexing methods;
DS-3 rate from SONET STS-1 format;
DS-3 rate from other multiplexing methods;
DS-4NA rate from other SONET STS-3C format;
DS-4NA rate from other multiplexing methods;
FDDI rate from SONET STS-3C format;
FDDI rate from other multiplexing methods;
E1-4 (European Telecom) rates from SONET format; and
E1-4 (European Telecom) rates from other multiplexing methods.

It is thus seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims ar intended to cover all of the generic and specific features of the invention herein described, and all statements of the scope of the invention which, as a matter of language, might be said to fall therebetween.

Having described the invention, what is claimed is:

1. A digital desynchronizer for smoothing phase jumps caused by pointer changes of a first signal operating in a first format mapped into a signal operating in a second format comprising:

A) digital elastic store means for generating a digital elastic store position detection output signal (FJTR), said means having means for receiving the write address and read address associated with the signal operating in the first format, as well as an input for receipt of a threshold signal which in turn is a function in part of the digital elastic store position detection output signal;

B) digital frame jitter filter means for generating a digital frame induced jitter filter output signal (DELTA) having an input connected to the elastic store position output signal (FJTR), said DELTA output signal being linear and proportional to the elastic store position output signal, said digital frame induced jitter filtering means also having means for generating said threshold signal, wherein said threshold signal is a function of the elastic store output signal (FJTR);

C) digital leak filter means connected to the DELTA output, for generating a digital leak rate filter output signal (VCO), said VCO signal being proportional to the desired transmission frequency of the signal in said first format;

D) digital VCO means connected to the VCO signal, for generating a clock signal operating at a frequency of the second format; and E) means, connected to the clock signal, for generating said read address associated with the signal operating in the first format.

2. A digital desynchronizer as defined in claim 1, wherein the digital elastic store position detection means comprises first binary adder for subtracting the read adss count from the write address count and a second binary adder for subtracting the threshold signal from the output of the first adder and further comprising a decoder having an input connected to the output of the second adder for generating the FJTR output signal based upon the magnitude of the output of the second adder.

3. A digital desynchronizer as defined in claim 2, wherein the frame jitter filter means comprises a binary counter for counting the FJTR output signal, and an up/down counter connected to the output of the binary counter, said up/down counter having an output of which a portion thereof represents the value of the threshold signal, and an add one module connected to the output of the up/down counter for generating the value of DELTA.

4. A digital desynchronizer as defined in claim 3, wherein the leak filter means comprises an offset module, having an input connected to the DELTA output of the frame jitter means, said offset module having means for generating a non-continuous transfer function output for fault recovery purposes.

5. A digital desynchronizer as defined in claim 4, wherein the leak filter means in an in-line configuration of the desynchronizer further comprises a nominal module having an input connected to the DELTA output of the frame jitter means, wherein the nominal module comprises a binary counter for integrating the DELTA output of the frame jitter module.

6. A digital desynchronizer as defined in claim 5, wherein the leak filter means further comprises a first summer having on input connected to the DELTA output of the frame jitter means and a second input connected to the output of the offset module, the leak filter means further comprising a second summer having one input connected to the output of the first summer and a second input connected to the output of the nominal module so as to generate the VCO signal.

7. A digital desynchronizer as defined in claim 6, wherein the digital VCO means has a non-linear transfer function and has an input connected to a bias signal and means connected to said bias signal for adjusting the gain characteristics of the non-linear digital VCO based upon the value of the bias signal and thus adjusting the bandwidth of the desynchronizer.

* * * * *

UNITED STATES PATENT AND TRADEMARK OFFICE
CERTIFICATE OF CORRECTION

PATENT NO. : 5,200,982
DATED : April 6, 1993
INVENTOR(S) : Weeber

It is certified that error appears in the above-identified patent and that said Letters Patent is hereby corrected as shown below:

At column 12, line 47, please insert --a-- prior to "first".

At column 12, line 48, please change "adss" to --address--.

At column 13, line 12, please change "on" to --one--.

Signed and Sealed this

Eighth Day of March, 1994

*Attest:*

BRUCE LEHMAN

*Attesting Officer*  *Commissioner of Patents and Trademarks*